US008612581B1

(12) United States Patent
Craig et al.

(10) Patent No.: US 8,612,581 B1
(45) Date of Patent: Dec. 17, 2013

(54) NETWORK MONITORING ON A MOBILE PLATFORM

(75) Inventors: John A. Craig, Snohomish, WA (US); Shawn W. Lorimer, Spanaway, WA (US); Steven J. Bates, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 195 days.

(21) Appl. No.: 13/179,067

(22) Filed: Jul. 8, 2011

(51) Int. Cl.
*G06F 15/173* (2006.01)

(52) U.S. Cl.
USPC .......................................................... 709/224

(58) Field of Classification Search
USPC ................................. 709/223–224, 232–234; 455/226.2–226.4
See application file for complete search history.

(56) References Cited

U.S. PATENT DOCUMENTS

| | | | |
|---|---|---|---|
| 6,947,726 B2 | 9/2005 | Rockwell | |
| 7,050,931 B2 * | 5/2006 | Conrad | 702/177 |
| 7,099,331 B2 | 8/2006 | Taylor | |
| 7,263,464 B1 | 8/2007 | Dugger | |
| 7,940,791 B2 * | 5/2011 | Farricker et al. | 370/463 |
| 7,941,108 B2 * | 5/2011 | Shaffer et al. | 455/115.3 |
| 8,331,866 B2 * | 12/2012 | Huoviala | 455/67.11 |
| 2004/0143663 A1 * | 7/2004 | Leedom et al. | 709/226 |
| 2007/0066297 A1 | 3/2007 | Heidari-Bateni | |
| 2007/0183435 A1 * | 8/2007 | Kettering et al. | 370/401 |
| 2008/0075090 A1 * | 3/2008 | Farricker et al. | 370/395.53 |
| 2009/0037526 A1 * | 2/2009 | Elliott et al. | 709/203 |
| 2009/0222553 A1 * | 9/2009 | Qian et al. | 709/224 |
| 2012/0008509 A1 * | 1/2012 | Myers et al. | 370/252 |
| 2012/0102152 A1 * | 4/2012 | Pearson et al. | 709/219 |

\* cited by examiner

*Primary Examiner* — Brendan Higa
(74) *Attorney, Agent, or Firm* — Yee & Associates, P.C.

(57) ABSTRACT

A system and method for monitoring a network data processing system on a mobile platform. Current traffic in the network data processing system may be monitored by a processor unit while the mobile platform is moving. The current traffic is compared by the processor unit with a baseline of traffic in the network processing system to form a comparison. A determination is made as to whether an undesired event has occurred in the traffic based on the comparison. An action may be initiated responsive to a determination that an undesired event has occurred.

20 Claims, 8 Drawing Sheets

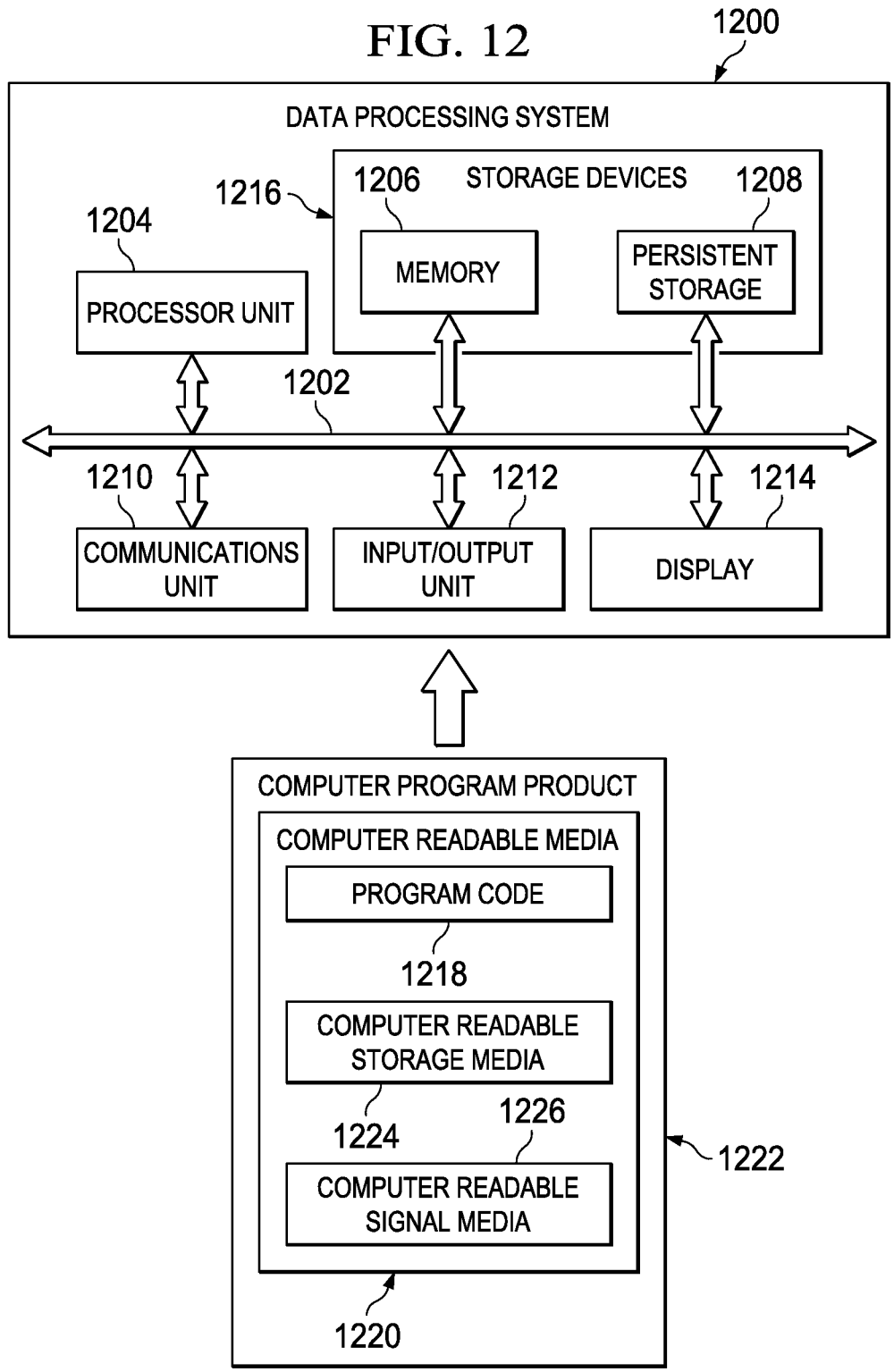

NETWORK MONITORING ON A MOBILE PLATFORM

BACKGROUND INFORMATION

1. Field

The present disclosure relates generally to data processing system networks on mobile platforms, such as aircraft, and, more particularly, to systems and methods for monitoring traffic on such networks.

2. Background

Aircraft network data processing systems can be very complex. For example, aircraft network data processing systems may be used to process various parameters while the aircraft is in flight and to provide aircraft control, alerting functions, and maintenance reports. Connectivity may be provided between the on-board aircraft network data processing system and ground-based data processing systems or networks outside of the aircraft. For example, such connectivity allows an airline or other entity to provide advanced maintenance diagnostics and situational awareness that may not be provided on the aircraft itself.

Such connectivity also allows the aircraft to provide to the ground-based entity data gathered or generated by the aircraft while the aircraft is in flight. This data may include, for example, meteorological data, airspeed, location of the aircraft while in flight, as well as other similar data for the aircraft in flight.

The Aircraft Communications Addressing and Reporting System (ACARS) uses satellite connectivity for aircraft communications. This system provides a data channel for transmission of short messages to and from the flight deck of an aircraft. This system has been used for data transmissions for a variety of applications. This system is a precursor to the high speed communications links that are now starting to be used for air-to-ground connectivity in commercial airline fleets.

Examples of current systems for air-to-ground connectivity to aircraft include terrestrial and satellite networks using L band, $K_u$ band, and $K_a$ band. In addition to these systems, connectivity from an aircraft-to-ground-based system may include terminal wireless communications using Wi-Fi, cellular networks, and Wi-Max technologies. These systems may utilize commercial technologies and use Internet Protocol and Ethernet protocols for the connectivity.

As technologies and computing architectures have evolved, so have the data bus structures that are used for network data processing systems on aircraft. As network computing first became prevalent, simple data bus protocols were developed and deployed to commercial aircraft. Since digital interfaces were introduced in the late 1970s, aircraft have used both data buses and protocols that were designed specifically for aviation applications and data buses and protocols that were adapted for aviation applications from other commercial applications. These aviation-specific buses and protocols were not necessarily proprietary but still had limited exposure to the general public. Examples of such data buses include data buses defined by standards, such as RS-485, ARINC 429, MIL-STD-1553, and ARINC 629, among others. RS-485 and ARINC 429 data buses employ a one-way serial bus. MIL-STD-1553 data buses employ a bus structure with a centralized controller. ARINC 629 data buses employ a two-way transmit and receive bus. Many data buses of these types are still in use on existing aircraft and are being used in new aircraft designs. A feature of these data buses is a specific aviation application and targeted system communications.

As consumer technologies have advanced, many designs for data buses used in aircraft have evolved from a supplier-based proprietary design to a commercial off-the-shelf based design. Rather than invent new technologies, aircraft suppliers have already deployed and tested commercial off-the-shelf technologies. Such use of commercial technology provides large gains with system designs utilizing processor-based hardware and common hardware based platforms for hosting software functionality. Specific aircraft interfaces may be designed into these systems and easily interfaced with the commercial off-the-shelf technology.

One of the commercial technologies that has taken hold in aircraft applications is Ethernet networks. Ethernet networks and protocols were devised in the early 1980s and have remained somewhat stable at the basic network layer. Currently, Ethernet features advanced protocols capable of large bandwidth and information exchange.

The Ethernet protocol has been adopted for various aviation applications. This protocol became the basis for the bulk of broadband airborne and ground-based aircraft connectivity, especially in the passenger cabin of commercial aircraft. As new aircraft were introduced, Ethernet networks gained wider use in avionics systems, replacing some of the older protocol networks.

As Ethernet networks are introduced into an aircraft, the standard aircraft design process still must be adhered to. For example, a functional hazard assessment must be performed for each aircraft system. This assessment must address all interfaces and software at the appropriate level. For example, critical systems with non-essential system interfaces must account for that in their system design. This means that failure modes or false data would be accounted for in the basic design process. Adding a different network protocol or interface does not change the basic design methodology. However, the different network protocol or interface will have logic and other source data to validate the data or use it in a manner that does not impact a critical function.

Network data processing systems on aircraft may provide isolation of critical systems from other systems on the aircraft. For example, an ARINC 629 type data bus provides a gateway function designed to isolate systems and data streams. Communications between systems on an ARINC 629 bus and other systems in an electronic library system may be routed through an aircraft information management system cabinet. The aircraft information management system cabinet may provide, for example, Ethernet, ARINC 629, and ARINC 429 interfaces, with gateways and processor modules to transfer data among them.

Recent Ethernet network architectures used in aircraft have followed a similar model. The ARINC 664 network standard was developed at the aircraft industry level to define specific control zones or domains and to isolate and provide a controlled interface between these domains. These domains include an aircraft control domain, an airline information services domain, and a passenger information and entertainment services domain.

Communications between these domains may be managed and monitored to ensure the appropriate isolation between domains. For example, communications between the domains may be managed and monitored using mechanisms, such as standard information technology industry switching and routing with port monitoring and virtual private networks employing encrypted tunnels between secure end points. With these different domains, access to the network data processing system on the aircraft has become more of a concern. Unauthorized access may affect the performance of the aircraft. Also, unauthorized access may allow unauthorized persons to access proprietary information, such as data and programs on the aircraft network processing system.

Accordingly, it would be advantageous to have a method and apparatus that takes into account one or more of the issues discussed above, as well as possibly other issues.

SUMMARY

An advantageous embodiment of the present disclosure provides a method for monitoring a network data processing system on a mobile platform. Current traffic in the network data processing system on the mobile platform is monitored by a processor unit on the mobile platform while the mobile platform is moving. The current traffic is compared by the processor unit with a baseline of traffic in the network data processing system to form a comparison. Based on the comparison, it is determined whether an undesired event has occurred in the current traffic. An action may be initiated if it is determined that an undesired event has occurred.

Another advantageous embodiment of the present disclosure provides a network analyzer on a mobile platform. The network analyzer is connected to a network data processing system on the mobile platform. The network analyzer is configured to monitor current traffic in the network data processing system on the mobile platform while the mobile platform is moving, compare the current traffic with a baseline of traffic in the network data processing system to form a comparison, determine whether an undesired event has occurred in the current traffic based on the comparison, and initiate an action responsive to a determination that the undesired event has occurred.

Another advantageous embodiment of the present disclosure provides a method for identifying a baseline of traffic in a network data processing system on a mobile platform. Selected events occurring in traffic in the network data processing system on the mobile platform are identified while the mobile platform is moving. The selected events are logged to form a log file. The baseline of the traffic is identified from the log file.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 12 is an illustration of a data processing system in accordance with an advantageous embodiment.

DETAILED DESCRIPTION

The different advantageous embodiments recognize and take into account a number of different considerations. "A number", as used herein with reference to items, means one or more items. For example, "a number of different considerations" may be one or more different considerations.

The advantageous embodiments recognize and take into account that to protect the critical and essential functions of a network data processing system on an aircraft, some key items are followed for the network design. These items include layered defense, active monitoring, and configuration management. In active monitoring, features are introduced into the software operating on the network to log different network activity. Logged network activity may include many different parameters, network traffic, types of communications protocols being used, and other network activity. The logs can then be used to provide an analysis of the system and look for undesired events that may arise.

The advantageous embodiments recognize and take into account that currently, network data processing systems on aircraft provide for the collection of network traffic and logging different parameters. This logging provides a history of network activity. Currently, logs are downloaded from the aircraft and analyzed at a location on the ground. Guidance is provided to the aircraft operators to download the log files. The log files then may be analyzed at a location on the ground using software tools developed for that purpose.

The advantageous embodiments recognize and take into account that currently, logs of network activity may be left on an aircraft for about 30 to about 60 days before being downloaded for analysis. This separation in time between when network activity is logged and when the network activity is analyzed leaves an open window in time where the status of the network is not known below the maintenance level of the aircraft central maintenance function.

In the illustrative example, a monitoring and analysis function is provided in a network data processing system on an aircraft that complements the analysis of network activity that is performed on the ground. Network monitoring and analysis in accordance with an advantageous embodiment provides real-time feedback for any anomalies that may be discovered in network activity in the network data processing system on the aircraft. In the illustrative example, an application may be provided in the network data processing system on an aircraft to monitor the network in real time. Monitored network traffic may be compared to a defined baseline of traffic in the network data processing system. Based on the comparison, the occurrence of an undesired event in the current network traffic may be detected. An appropriate action may be taken immediately in response to the detection of the occurrence of an undesired event.

Figure 1:
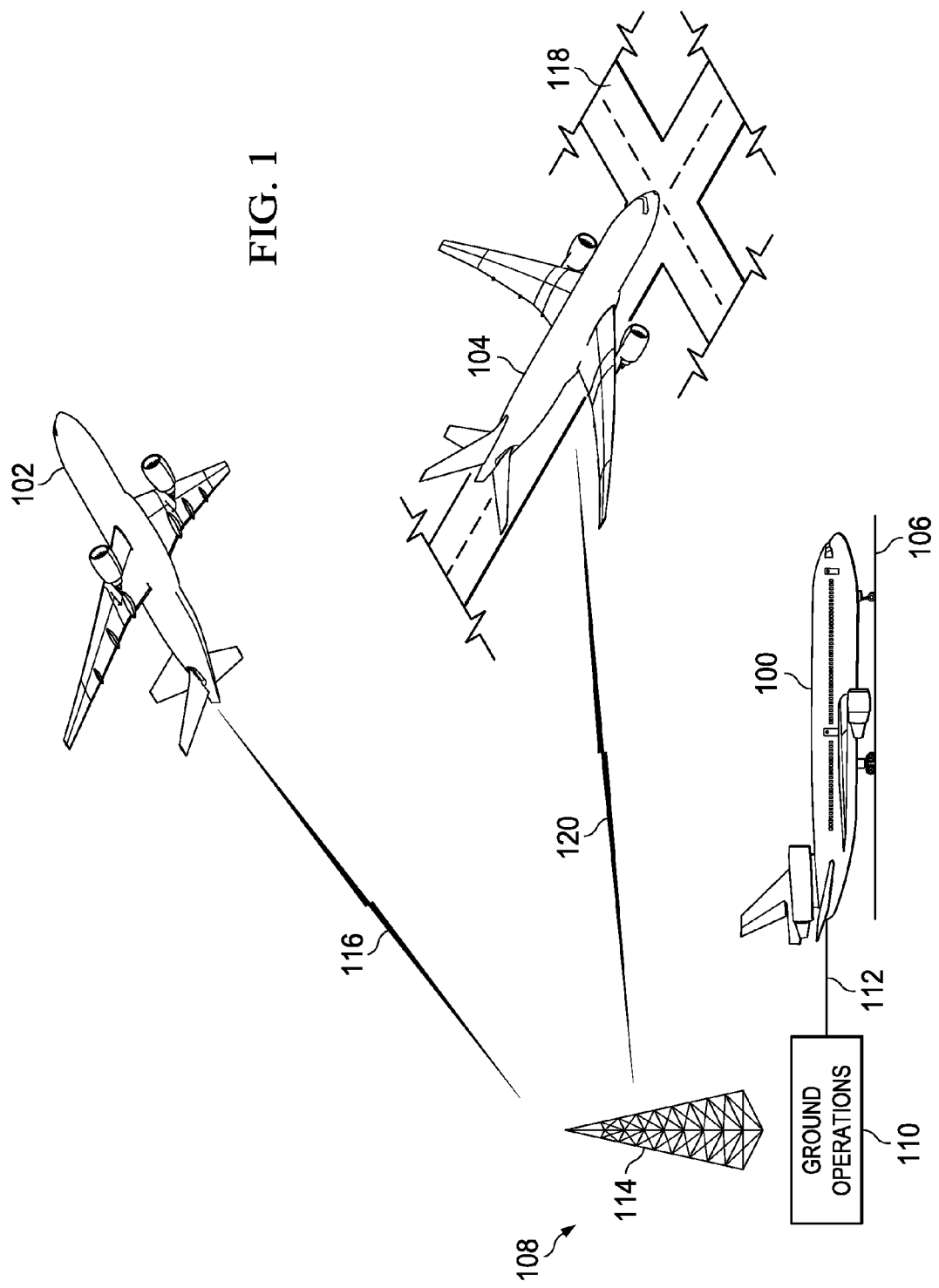
FIG. 1 is an illustration of aircraft in operation in accordance with an advantageous embodiment.

Turning first to FIG. 1, an illustration of aircraft in operation is depicted in accordance with an advantageous embodiment. Aircraft 100, 102, and 104 are shown at various locations during operation. Aircraft 100, 102, and 104 may comprise any aerospace vehicle including any fixed-wing or rotary-wing aircraft. Aircraft 100, 102, and 104 may comprise any commercial, private, business, government, or military aircraft used for any purpose.

Aircraft 100 is parked on ground 106 at location 108. Location 108 may include a facility for various ground operations 110. For example, ground operations 110 may include various maintenance operations to be performed on aircraft 100. Such maintenance operations may include operations for downloading a log file from aircraft 100 and analyzing the log file to determine any maintenance operations that may be required.

During operation of aircraft 100, network traffic on a network data processing system on aircraft 100 may be monitored. Selected events occurring in the monitored network traffic may be detected and logged in the log file. When aircraft 100 is at location 108, the log file may be downloaded for use by ground operations 110. For example, the log file may be downloaded from the network data processing system on aircraft 100 to a data processing system at ground operations 110 via communications link 112. Communications link 112 may be a wired link or a wireless link. Communications link 112 may be implemented in any known manner using any known communications or network devices and appropriate protocols to transfer the log file from aircraft 100 to ground operations 110.

The log file downloaded from aircraft 100 may be analyzed by ground operations 110. For example, ground operations 110 may analyze the log file using software tools developed for the purpose of detecting anomalies in the logged network traffic. The detection of such anomalies in the logged network traffic may indicate that maintenance or other operations should be performed on aircraft 100. In the illustrative example, ground operations 110, also or alternatively, may analyze the log file downloaded from aircraft 100 to identify from the log file a baseline of traffic in the network data processing system on aircraft 100 during normal operation of aircraft 100.

Communications equipment 114 also may be located at location 108. Communications equipment 114 may allow ground operations 110 to communicate with aircraft 102 and aircraft 104 and other aircraft that are not at location 108. Ground operations 110 also may communicate with aircraft 100 using communications equipment 114. Communications equipment 114 may include any known communications equipment for establishing a communications link between ground operations 110 and aircraft 100, 102, 104, and/or other aircraft.

For example, communications equipment 114 may comprise a receiver, a transmitter, an antenna, a user interface device, or any other hardware and/or software operating together in any combination to establish the desired communications links. Specifically, without limitation, communications equipment 114 may provide for transferring at least one of video, audio, and data in any combination between aircraft 100, 102, 104, and/or other aircraft, and ground operations 110.

Aircraft 102 may be an aircraft in flight. While aircraft 102 is in flight, network traffic on a network data processing system on aircraft 102 may be monitored. Selected events occurring in the monitored network traffic may be detected and logged in a log file on aircraft 102 while aircraft 102 is in flight.

Aircraft 102 may include communications equipment thereon that allows aircraft 102 to communicate with ground operations 110 while airborne. For example, aircraft 102 may include appropriate communications equipment for establishing communications link 116 between aircraft 102 and ground operations 110 via communications equipment 114 at location 108. For example, communications equipment on aircraft 102 may comprise a receiver, a transmitter, an antenna, a user interface device, or any other hardware and/or software operating together in any combination to establish communications link 116. Communications link 116 may be implemented in any known and appropriate manner for providing an air-to-ground communications link. For example, communications link 116 may employ any known and available terrestrial or satellite communications system or network for providing air-to-ground communications between aircraft 102 and location 108 on ground 106. For example, without limitation, audio, video, or data, in any combination, may be transferred between aircraft 102 and ground operations 110 via communications link 116.

Aircraft 104 may be an aircraft on the ground at location 118. For example, location 118 may be an airport located at a distance from location 108. While aircraft 104 is on the ground at location 118, network traffic on a network data processing system on aircraft 104 may be monitored. Selected events occurring in the monitored network traffic may be detected and logged in a log file on aircraft 104 while aircraft 104 is on the ground at location 118.

Aircraft 104 may include communications equipment thereon that allows aircraft 104 to communicate with ground operations 110 while aircraft 104 is on the ground at location 118. For example, aircraft 104 may include appropriate communications equipment for establishing communications link 120 between aircraft 104 and ground operations 110 via communications equipment 114 at location 108. For example, communications equipment on aircraft 104 may comprise a receiver, a transmitter, an antenna, a user interface device, or any other hardware and/or software operating together in any combination to establish communications link 120.

Communications link 120 may be implemented in any known and appropriate manner. For example, communications link 120 may employ any known and available terrestrial or satellite communications system or network for providing communications between aircraft 104 at location 118 and location 108. For example, without limitation, audio, video, or data, in any combination, may be transferred between aircraft 104 and ground operations 110 via communications link 120.

Communications links 112, 116, and 120 may be implemented using various systems, operating frequencies, and communications protocols, in any combination, to provide a communications link from an aircraft to a ground location. For example, one or more of communications links 112, 116, and 120 may be established via radio operating at VHF or HF frequencies or via satellite communications. These types of communications links may be provided by an air-to-ground data link service, such as the Aircraft Communications Addressing and Reporting System (ACARS).

As another example, one or more of communications links 112, 116, and 120 may be established via a wireless local area network. These types of communications links may be used to provide a link to an airport data processing network at an airport terminal. As yet another example, one or more of communications links 112, 116, and 120 may be established via a broadband or cellular network. These types of communications links may be provided by an air-to-ground broadband network or service, such as that offered by Inmarsat PLC. In any case, the particular type of communications link that will be used for communications with aircraft 100, 102, or 104 in any particular situation may depend on such factors as the location of aircraft 100, 102, or 104, the relative location of ground operations 110 to which communications are to be established, and the nature of the data or other information to be transferred via the communications link.

In addition to a network data processing system and communications equipment, aircraft 100, 102, and 104 may comprise various sensor systems. Such sensor systems may be used to detect various operating states of aircraft 100, 102, or 104. For example, such sensor systems may be used to determine a phase of flight of aircraft 100, 102, or 104. In this example, the sensor systems may be used to determine whether aircraft 100, 102, or 104 is at the gate, taking off, in level flight, landing, or in some other phase of flight. As another example, sensors on aircraft 100, 102, or 104 may be used to detect other operating states of aircraft 100, 102, or 104. Sensors on aircraft 100, 102, or 104 also may be used to determine the current location of aircraft 100, 102, or 104.

The illustration of FIG. 1 is not meant to imply physical or operational limitations to the manner in which different advantageous embodiments may be implemented. For example, ground operations 110 may be in communication with and provide services for more or fewer than three aircraft. Furthermore, ground operations 110 may not necessarily be located at a single location.

Figure 2:
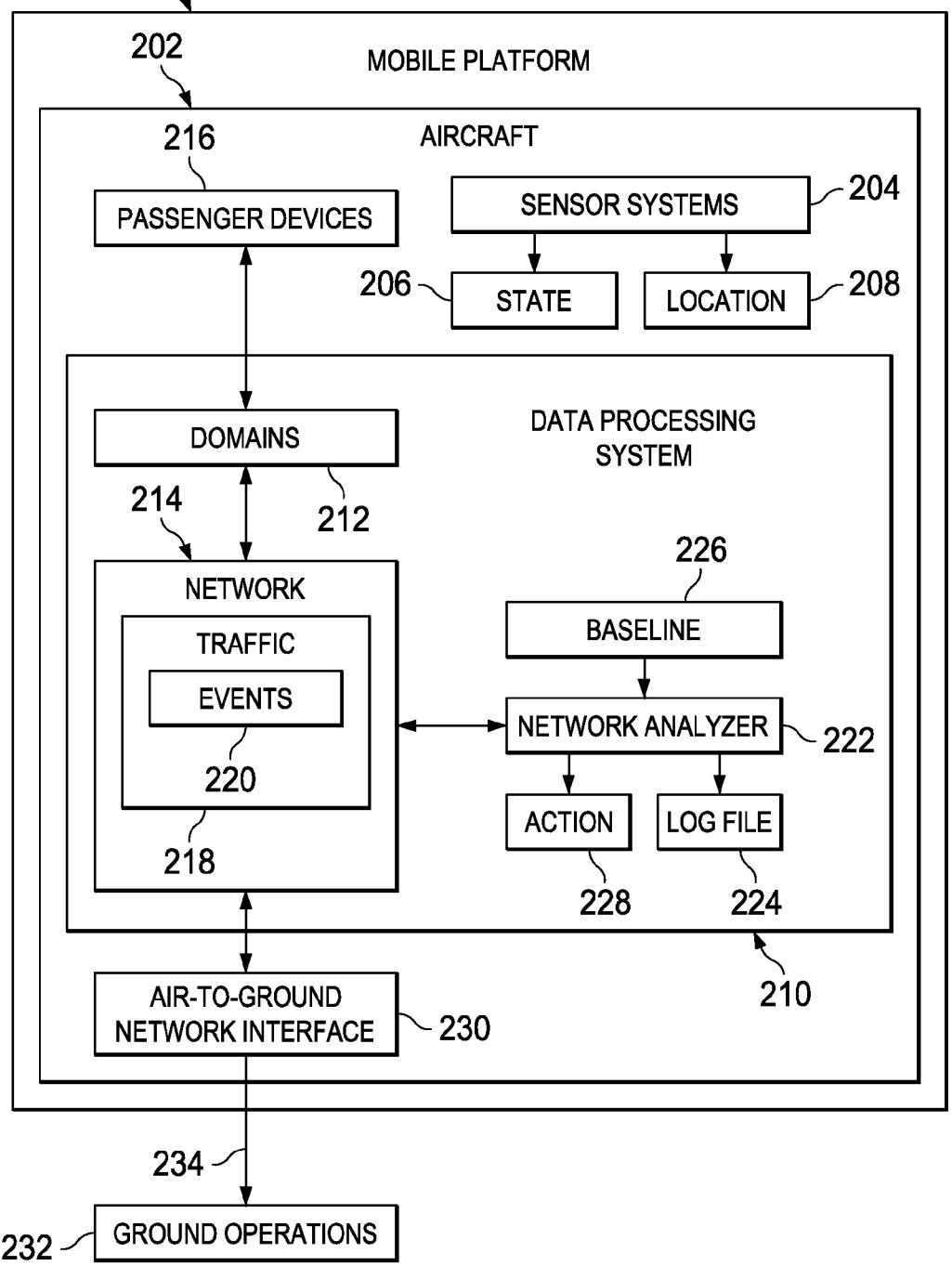
FIG. 2 is a block diagram of a network data processing system on a mobile platform in accordance with an advantageous embodiment.

Turning now to FIG. 2, a block diagram of a network data processing system on a mobile platform is depicted in accordance with an advantageous embodiment. Mobile platform 200 may be, without limitation, a vehicle. The vehicle may be an aircraft, a submarine, a train, a spacecraft, a surface ship, or any other suitable vehicle. For example, mobile platform 200 may be aircraft 202. In this example, aircraft 202 is one example of aircraft 100, 102, or 104 in FIG. 1.

Aircraft 202 may comprise various sensor systems 204. Sensor systems 204 may include various systems on aircraft 202 for determining state 206 of aircraft 202. State 206 may be a current state of aircraft 202 in these illustrative examples. For example, without limitation, such sensor systems 204 may comprise a pitot tube; a temperature sensor; an altimeter; landing gear sensors that indicate whether landing gear are extended or retracted and whether landing gear are in contact with the ground; sensors to identify the positions of various aircraft control surfaces, such as flaps, ailerons, and the like; and other sensor systems that may be used to determine state 206 of aircraft 202.

Sensor systems 204 also may include various systems on aircraft 202 for determining location 208 of aircraft 202. Location 208 may be a current location of aircraft 202 in these illustrative examples. For example, without limitation, such sensor systems 204 may include a global positioning system receiver, an inertial navigation unit, or other systems for determining location 208 of aircraft 202.

Data processing system 210 may be provided on aircraft 202. For example, data processing system 210 may be a network data processing system comprising a number of computers or other data processing devices for performing various aircraft functions in a number of domains 212. The computers or other data processing devices in domains 212 may be in communication with each other via network 214.

Passenger devices 216 also may be connected to network 214. Typically, passenger devices 216 may be connected to network 214 via a passenger device interface provided in one of domains 212. Passenger devices 216 may include devices that are owned and operated by passengers on aircraft 202. Thus, passenger devices 216 are located on aircraft 202 but are not part of data processing system 210. In general, the operation of passenger devices 216 by passengers on aircraft 202 may not be controlled or may be under only limited control by an operator of aircraft 202. Examples of passenger devices 216 may include, without limitation, general purpose computing devices, such as laptops or notebook computers; wireless communication and organization devices, such as cellular telephones and personal digital assistant devices; gaming devices; electronic books; and/or various other electronic devices.

Network 214 may be implemented using any appropriate network architecture and network protocols. For example, network 214 may be an Ethernet-based network. Preferably, network 214 is implemented in accordance with an appropriate standard for networks on aircraft. In the illustrative example, network 214 preferably provides for monitoring and management of communications among and between domains 212 and passenger devices 216 to ensure appropriate isolation among and between domains 212 and passenger devices 216.

Communications between various systems and devices in domains 212 and passenger devices 216 result in traffic 218 on network 214. Traffic 218 on network 214 may be in the form of data packets or datagrams. Many of the data packets or datagrams forming traffic 218 on network 214 are used to communicate information between the various systems or devices that are connected to network 214. Some of the data packets or datagrams forming traffic 218 on network 214 may comprise control data. Such control data may be used to control operation of network 214 or to control operation of one or more systems or devices on network 214 rather than communicate information between systems or devices on network 214. Traffic 218 on network 214 also may be referred to as network activity.

Events 220 are characterized by traffic 218 on network 214 at a point in time or over a period of time. Events 220 occurring in traffic 218 indicate that something of interest is occurring or has occurred in network 214, or in a system or device, or in multiple systems or devices, that are connected to network 214.

Events 220 may be characterized by specific data packets or datagrams occurring in traffic 218, by specific types of data packets or datagrams occurring in traffic 218, by the timing of the occurrence of specific data packets or datagrams or types of data packets or datagrams in traffic 218, by various characteristics of traffic 218 as a whole on network 214, by any number of these factors considered together in any combination, or by the relationship between any number of these factors. Characteristics of traffic 218 as a whole on network 214 that may be considered to determine whether events 220 have occurred may include, for example, without limitation, the total volume of traffic 218 or loading on network 214, the rate of traffic 218 on network 214, and/or other characteristics of traffic 218 as a whole.

In the illustrative example, network analyzer 222 may be provided on aircraft 202. For example, network analyzer 222 may be implemented in software, hardware, or a combination of software and hardware. In these examples, network analyzer 222 may be located in a computer or other processor unit that is part of data processing system 210. Network analyzer 222 may be implemented as one of the functions in one of domains 212. In any case, network analyzer 222 is connected to network 214.

Network analyzer 222 is configured to monitor current traffic 218 on network 214 while mobile platform 200 is moving. Network analyzer 222 may identify the occurrence of selected events 220 in monitored traffic 218. Network analyzer 222 may save indications of the occurrence of such selected events 220 in log file 224.

In the illustrative example, network analyzer 222 may compare monitored traffic 218 to baseline 226. Baseline 226 may provide a description of expected traffic 218 on network 214 during normal operation of aircraft 202. Based on the comparison, network analyzer 222 may determine that one or more events 220 occurring in traffic 218 on network 214 has exceeded or otherwise deviated from baseline 226. Such a deviation from baseline 226 indicates that the one or more events 220 are undesired events. In response to determining that one or more undesired events 220 have occurred, network analyzer 222 may initiate an appropriate action 228.

In the illustrative example, the comparison of traffic 218 with baseline 226, the identification of undesired events 220, and the initiation of action 228 may be performed in real-time or near real-time by network analyzer 222 as traffic 218 on network 214 is being monitored while mobile platform 200 is moving. Therefore, action 228 may be taken as soon as undesired events 220 are identified while mobile platform 200 is moving. Such a rapid response to the detection of undesired events 220 means that the underlying cause of such events 220 can be identified and dealt with, if necessary, as soon as possible. Therefore, for example, network analyzer 222 allows an operator of aircraft 202 to deal with the underlying causes of undesired events 220 in real-time while aircraft 202 is in flight or otherwise away from a maintenance facility. Being able to promptly deal with the causes of undesired events 220 may reduce the impact of such causes on the operation of aircraft 202.

In the illustrative example, network analyzer 222 may initiate action 228 that is to be performed by ground operations 232 in response to identifying the occurrence of undesired events 220. Furthermore, log file 224 may be sent to ground operations 232 for detailed analysis in response to the identification of the occurrence of undesired events 220.

Air-to-ground network interface 230 on aircraft 202 may provide a connection between aircraft 202 and ground operations 232. Specifically, air-to-ground network interface 230 may provide a connection for transferring data between data processing system 210 on aircraft 202 and a data processing system associated with ground operations 232. Air-to-ground network interface 230 may be connected to network 214 to provide for the transfer of data to ground operations 232 from any systems or devices on aircraft 202 that are connected to network 214, including network analyzer 222.

Air-to-ground network interface 230 may be in communication with ground operations 232 via any appropriate air-to-ground communications link 234. Air-to-ground communications link 234 may be implemented using any system or method for air-to-ground communications that may be appropriate for the communication of data between air-to-ground network interface 230 and ground operations 232. Examples of such air-to-ground communications links are discussed above with reference to FIG. 1.

More detailed descriptions of various components in FIG. 2 are provided below. The illustration of FIG. 2 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, a network analyzer may be used to analyze any mobile network, including a mobile network that is not necessarily part of a vehicle or other mobile platform. Furthermore, a network analyzer may be used to analyze a network that is not mobile or not on a mobile platform but that shares certain characteristics with networks on mobile platforms. For example, a network analyzer may be used to analyze a network that is associated with real-world activities and that is periodically disconnected or otherwise isolated from other networks or systems that may provide maintenance functions for the network. During such periods of isolation, a network analyzer in accordance with an advantageous embodiment may provide real-time detection of undesired events by comparing network traffic to a baseline. By providing such real-time detection of undesired events, appropriate action can be taken immediately, for example, to prevent the underlying causes of such events from impacting the real-world activities.

Figure 3:
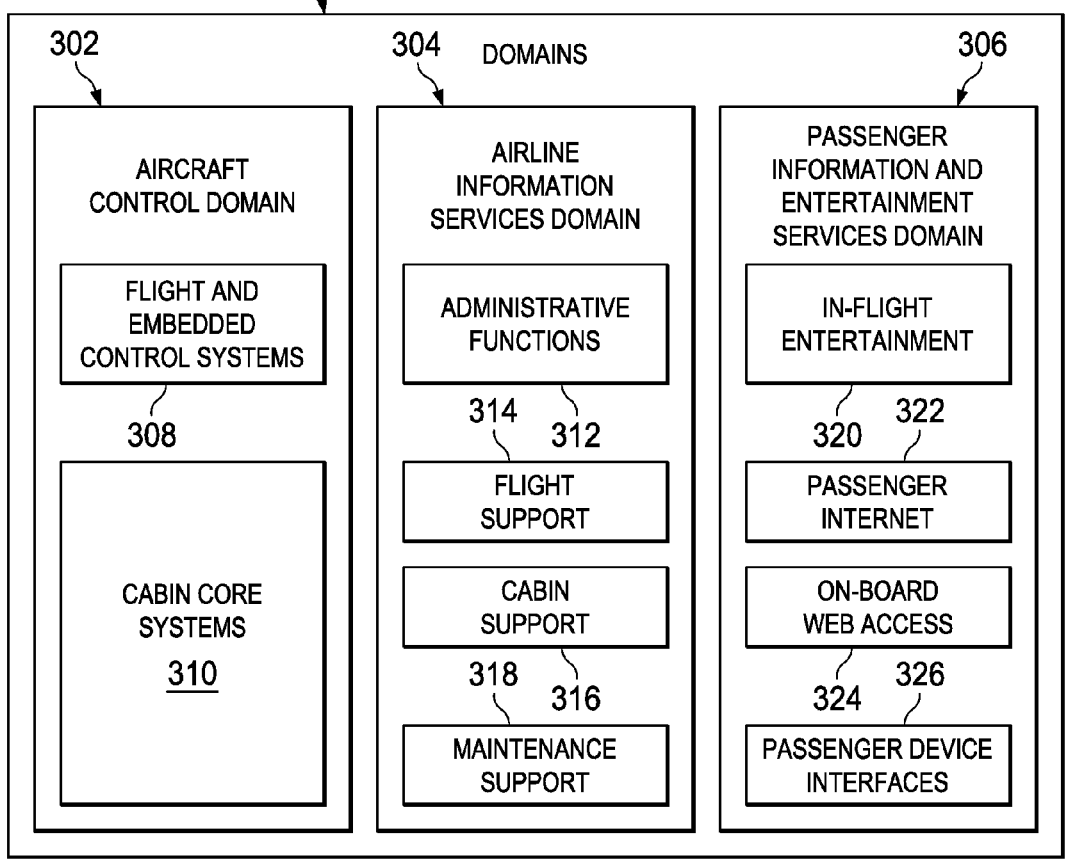
FIG. 3 is a block diagram of domains of a network data processing system of an aircraft in accordance with an advantageous embodiment.

Turning now to FIG. 3, a block diagram of domains of a network data processing system of an aircraft is depicted in accordance with an advantageous embodiment. In this example, domains 300 are an example of one implementation of domains 212 in FIG. 2. Domains 300 may comprise aircraft control domain 302, airline information services domain 304, and passenger information and entertainment services domain 306. Each of domains 302, 304, and 306 may comprise a number of systems for performing a number of functions necessary or desirable for operation of an aircraft. Communications between domains 302, 304, and 306 may be provided by a data network on the aircraft. As discussed above, communications between domains 302, 304, and 306 are managed and monitored to ensure isolation between domains 302, 304, and 306.

The role of the systems and functions in aircraft control domain 302 is to control the aircraft. In general, the aircraft manufacturer is responsible for the design and implementation of aircraft control domain 302. For example, without limitation, aircraft control domain 302 may comprise flight and embedded control systems 308 and cabin core systems 310.

The role of the systems and functions in airline information services domain 304 is to operate the aircraft. In general, design and implementation of airline information services domain 304 is a joint responsibility of the aircraft manufacturer and an airline or other aircraft operator working together cooperatively. For example, without limitation, airline information services domain 304 may comprise administrative functions 312, flight support 314, cabin support 316, and maintenance support 318.

The role of the systems and functions in passenger information and entertainment services domain 306 is to inform and entertain the passengers on the aircraft. In general, design and implementation of passenger information and entertainment services domain 306 is the responsibility of the airline or other operator of the aircraft. For example, without limitation, passenger information and entertainment services domain 306 may comprise in-flight entertainment 320, passenger Internet 322, on-board web access 324, and passenger device interfaces 326.

Figure 4:
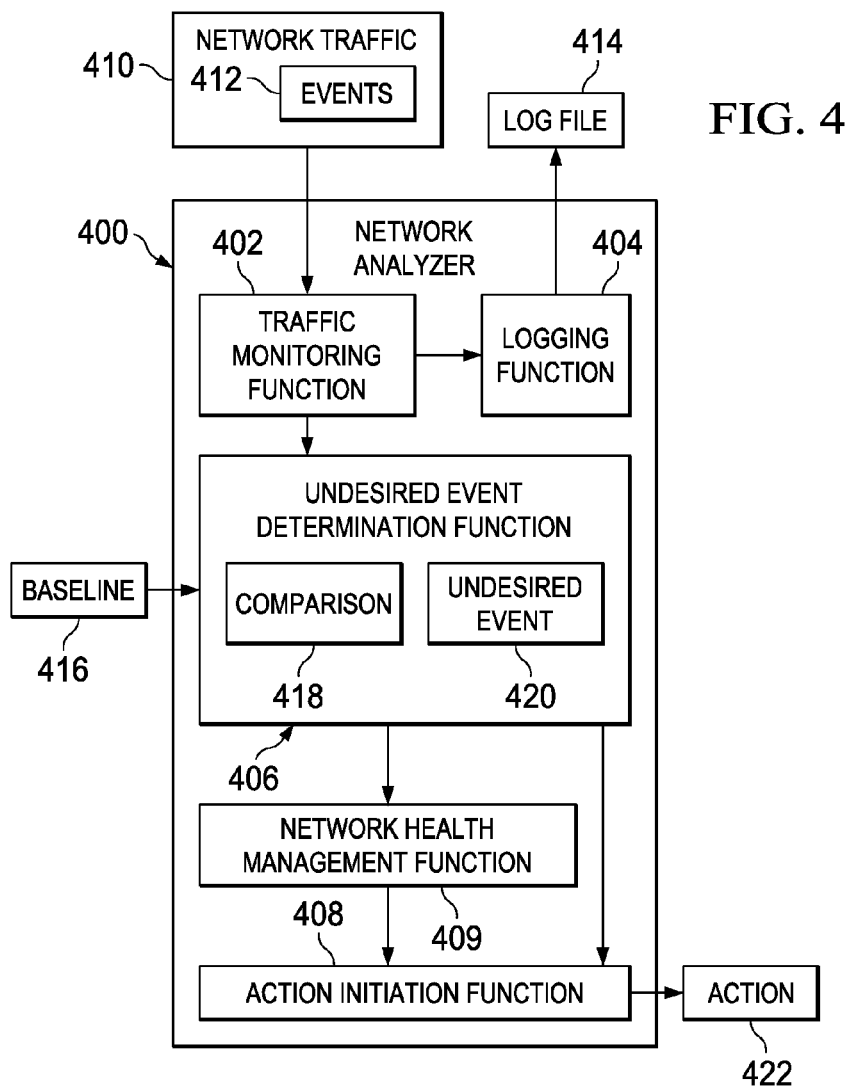
FIG. 4 is a block diagram of a network analyzer in accordance with an advantageous embodiment.

Turning now to FIG. 4, a block diagram of a network analyzer is depicted in accordance with an advantageous embodiment. In this illustrative example, network analyzer 400 is an example of one implementation of network analyzer 222 in FIG. 2. Network analyzer 400 may comprise traffic monitoring function 402, logging function 404, undesired event determination function 406, action initiation function 408, and network health management function 409.

Traffic monitoring function 402 monitors network traffic 410. For example, traffic monitoring function 402 may monitor network traffic 410 on a network data processing system on a mobile platform. Traffic monitoring function 402 may detect the occurrence of events 412 in network traffic 410.

Traffic monitoring function 402 may notify logging function 404 when certain selected events 412 occur in network traffic 410. In turn, logging function 404 may log the occurrence of such events 412 in log file 414. For example, logging function 404 may make an entry into log file 414 indicating selected events 412 that have occurred along with time stamps or other indicators to indicate the time at which selected events 412 occurred. Not all of events 412 occurring in network traffic 410 may be logged by logging function 404. It may be sufficient that only the occurrence of selected events 412 may be logged in log file 414 such that operation of the network, and systems and devices connected to the network, may be analyzed by analyzing the contents of log file 414.

Network traffic 410 monitored by traffic monitoring function 402 may be processed by undesired event determination function 406. Undesired event determination function 406 may use the same selected event data that is recorded by logging function 404 into log file 414. Thus, as log file 414 is written by logging function 404, undesired event determination function 406 may see and use the same data as logged. By using the same data as is logged, event correlation between undesired event determination function 406 and the data logged in log file 414 is easier. Using the same data also allows for further analysis of the results provided by undesired event determination function 406 using the same source data.

Undesired event determination function 406 compares current monitored network traffic 410 to baseline 416 to form comparison 418. Baseline 416 may provide a description of expected traffic on the network during normal operation of a mobile platform. Based on comparison 418, undesired event determination function 406 may determine that one or more events 412 occurring in network traffic 410 has exceeded or otherwise deviated from baseline 416. Such a deviation from baseline 416 indicates that one or more events 412 is undesired event 420.

Undesired event determination function 406 may activate action initiation function 408 in response to determining that undesired event 420 has occurred. Action initiation function 408 may then initiate appropriate action 422. For example, action initiation function 408 may employ a database matching possible undesired events with appropriate actions to determine action 422 to be initiated.

Network health management function 409 may be provided in addition to or as part of undesired event determination function 406. As discussed above, undesired event determination function 406 compares current network traffic 410 with normal network traffic defined in baseline 416 to determine the occurrence of undesired event 420. Thus, undesired event determination function 406 may provide a rapid indication when network traffic 410 is determined not to be normal so that appropriate action 422 may be taken. In contrast, network health management function 409 may monitor network traffic 410 over a period of time to provide predictive maintenance for the network data processing system.

Network health management function 409 may use the comparison between monitored network traffic 410 and baseline 416 to assess changes in network performance that may indicate network degradation. For example, such network degradation may be the result of environmental or aging impacts on the network wiring or other electronic hardware or software components of the network that may affect network performance. Network health management function 409 may use statistical methods over a period of time to determine overall network health. Network health management function 409 may activate action initiation function 408 in response to a determination of a trend that indicates network degradation.

In this case, action initiation function 408 may initiate action 422 appropriate for dealing with the determined network degradation. For example, in this case, action 422 may include, without limitation, triggering a maintenance operation or changing routing in the network to ensure proper network communications. Thus, network health management function 409 provides for determining network system level issues arising from normal hardware and software degradation so that such degradation may be addressed prior to causing an issue with overall platform operation.

Figure 5:
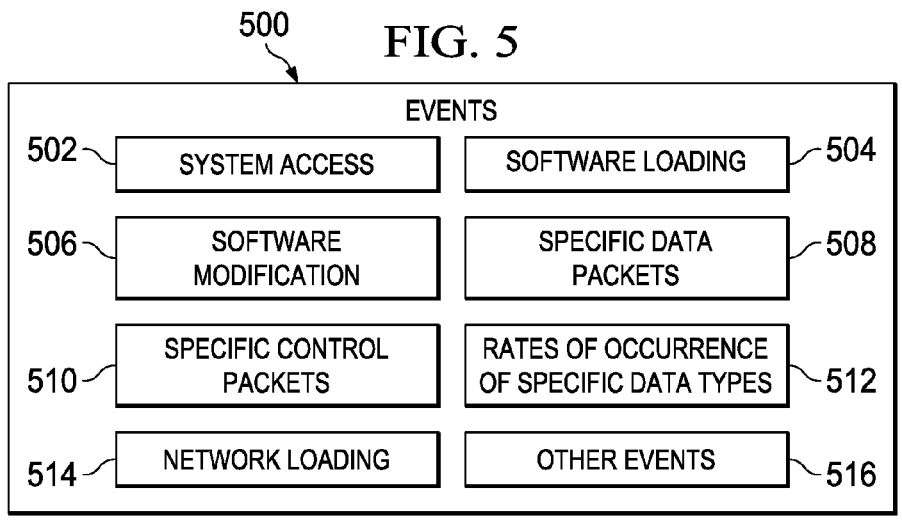
FIG. 5 is a block diagram of events occurring in network traffic in accordance with an advantageous embodiment.

Turning now to FIG. 5, a block diagram of events occurring in network traffic is depicted in accordance with an advantageous embodiment. In this example, events 500 are an example of events 220 in FIG. 2 or of events 412 in FIG. 4.

In the illustrative example, events 500 may be characterized by traffic on a network data processing system at a point in time or over a period of time. Events 500 occurring in the network indicate that something of interest is occurring or has occurred in the network, in a system or device, or in multiple systems or devices that are connected to the network. Events 500 may indicate system access 502. For example, events 500 may indicate that an attempt has been made to access a system or device on the network, or that a system or device on the network has been accessed. Events 500 may indicate software loading 504. For example, events 500 may indicate that software is being loaded onto a system or device connected to the network. Events 500 may indicate software modification 506. For example, events 500 may indicate that software on a system or device connected to the network is being modified.

Events 500 may be characterized by specific data packets or datagrams occurring in network traffic or by specific types of data packets or datagrams occurring in network traffic. For example, events 500 may be characterized by the content, type, or timing of the occurrence of specific data packets 508 or specific control packets 510 in the network traffic. As another example, events 500 may be characterized by rates of occurrence of specific data types 512 in the network traffic.

Events 500 also may be characterized by various characteristics of network traffic on the network as a whole. For example, events 500 may be characterized by network loading 514 or by other characteristics of the network traffic as a whole.

Events 500 may also include other events 516. Other events 516 may be related to, or entirely different from, the various events described previously. For example, other events 516 may be defined in terms of a number of events considered together in any combination, or by the relationship between any number of events.

Figure 6:
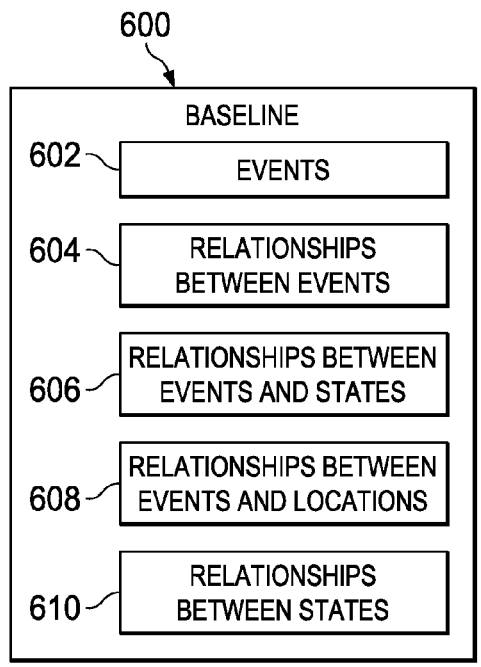
FIG. 6 is a block diagram of a baseline in accordance with an advantageous embodiment.

Turning now to FIG. 6, a block diagram of a baseline is depicted in accordance with an advantageous embodiment. In this example, baseline 600 is an example of one implementation of baseline 226 in FIG. 2 or of baseline 416 in FIG. 4.

Baseline 600 may provide a description of traffic on the data network of a mobile platform during normal operation of the mobile platform. For example, baseline 600 may be derived from a log file of network traffic on the mobile platform obtained during normal operation of the mobile platform. Since baseline 600 describes normal network traffic, network traffic that deviates from baseline 600 may indicate an undesired condition on the mobile platform. Thus, baseline 600 may be used to determine the occurrence of undesired events in network traffic by comparing the network traffic to baseline 600. In general, it may be said that baseline 600 defines the rules for detecting the occurrence of an undesired event in the network traffic.

Baseline 600 will be different from mobile platform to mobile platform. For example, baseline 600 may be different from aircraft to aircraft, depending on what systems or features an airline or other aircraft operator connects to the aircraft network. An aircraft manufacturer may provide baseline 600 as part of the initial aircraft configuration. As the network functions during operation of the aircraft, stable operation of the network during normal operation will be learned. Changes to baseline 600 may be recommended and made based on this experience with network traffic during stable network operation over a period of time.

Baseline 600 may describe normal network traffic in terms of events 602 that are expected to occur in network traffic during normal operation of a mobile platform. Therefore, if an event occurs in the network traffic that deviates from events 602 identified in baseline 600, that event may be an undesired event.

Baseline 600 also may describe normal network traffic in terms of relationships between events 604 that are expected to occur in network traffic during normal operation of a mobile platform. For example, relationships between events 604 may include the order in which specific events are expected to occur, expected separation in time of selected events, or other relationships between two or more events occurring in network traffic. If an event occurs in network traffic that deviates from relationships between events 604 identified in baseline 600, that event may be an undesired event.

For example, an event occurring in network traffic may indicate an attempt to access a particular system on a mobile platform. Typically, only a human operator may access the system in the manner indicated by the occurrence of the event. Therefore, relationships between events 604 in baseline 600 may indicate a minimum separation in time between events indicating an attempt to access the system. Many events indicating many attempts to access the system occurring in rapid succession may indicate an unauthorized attempt to access the system by an automated device. In this case, the occurrence of the events would violate the temporal relationship between such events, as defined in relationships between events 604 in baseline 600. Therefore, one or more of the events indicating an attempt to access the system may be identified as an undesired event.

Baseline 600 also may describe normal network traffic in terms of relationships between events and states 606. For example, relationships between events and states 606 may indicate that some events should only occur, or should never occur in the network traffic on a mobile platform while the mobile platform is in a certain state of operation. If an event occurs in network traffic on the mobile platform while the mobile platform is in a state that deviates from relationships between events and states 606 identified in baseline 600, that event may be an undesired event.

Baseline 600 also may describe normal network traffic in terms of relationships between events and locations 608. For example, relationships between events and locations 608 may indicate that some events should only occur, or should never occur, in the network traffic on a mobile platform while the mobile platform is at a certain location. If an event occurs in network traffic on the mobile platform while the mobile platform is at a location that deviates from relationships between events and locations 608 identified in baseline 600, that event may be an undesired event.

For example, relationships between events and locations 608 may indicate that certain events related to loading software onto the network data processing system of an aircraft should occur only when the aircraft is located at an authorized repair facility. Events indicating software loading that occurs while the aircraft is parked at a foreign airport far from an authorized repair facility, for example, may indicate an unauthorized attempt to change the aircraft system software. In this case, the occurrence of the events would violate relationships between events and locations 608 in baseline 600. Therefore, the occurrence in the network traffic of an event indicating loading of software may, in this case, be identified as an undesired event.

At a higher level, baseline 600 may define normal network traffic in terms of relationships between states 610. Relationships between states 610 may indicate the relationships between states that are expected to occur during normal operation of the mobile platform. For example, network traffic may indicate various states of a mobile platform. If the network traffic indicates states of the mobile platform having a relationship that deviates from relationships between states 610 in baseline 600, that may indicate that undesired events or states are occurring or have occurred.

Figure 7:
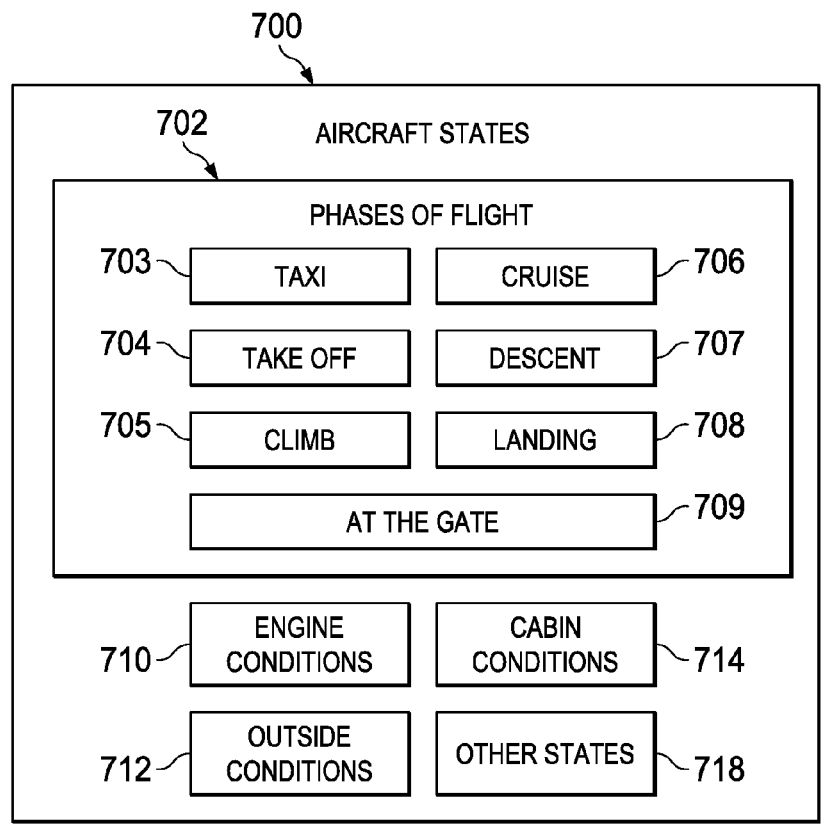
FIG. 7 is a block diagram of aircraft states in accordance with an advantageous embodiment.

Turning now to FIG. 7, a block diagram of aircraft states is depicted in accordance with an advantageous embodiment. In this example, aircraft states 700 are an example of states for state 206 in FIG. 2.

Aircraft states 700 may include various phases of flight 702 of an aircraft. For example, phases of flight 702 may include, without limitation, taxi 703, take off 704, climb 705, cruise 706, descent 707, landing 708, or at the gate 709. Other aircraft states 700 may include, without limitation, engine conditions 710, outside conditions 712, cabin conditions 714, and other states 718. For example, without limitation, engine conditions 710 may comprise engine temperature, engine pressure, or other engine parameters at one or more locations within an engine of the aircraft. For example, without limitation, outside conditions 712 may comprise temperature, pressure, or other conditions outside of the aircraft. For example, without limitation, cabin conditions 714 may comprise temperature, pressure, or other conditions within the aircraft passenger or crew cabin, or both.

Figure 8:
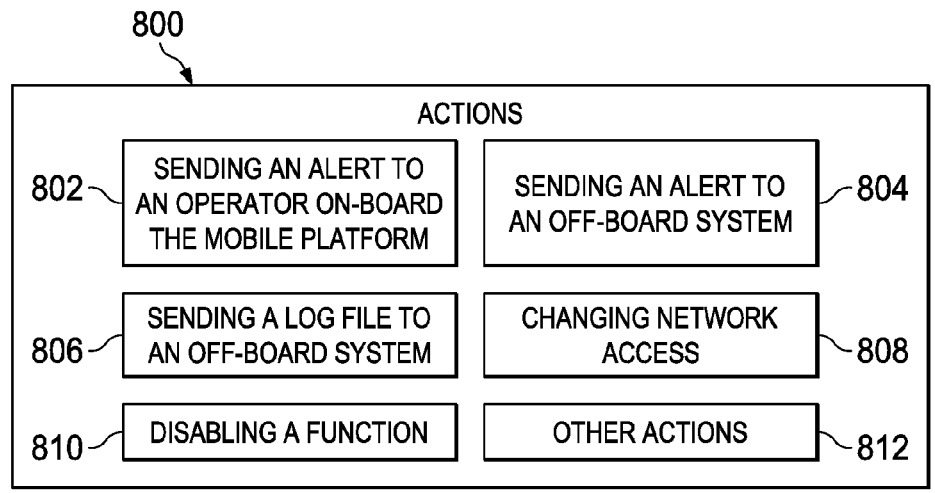
FIG. 8 is a block diagram of actions in accordance with an advantageous embodiment.

Turning now to FIG. 8, a block diagram of actions is depicted in accordance with an advantageous embodiment. In this example, actions 800 is an example of action 228 in FIG. 2 and of action 422 in FIG. 4. One or more of actions 800 may be initiated in response to the identification of an undesired event in network traffic on a mobile platform by a network analyzer in accordance with an advantageous embodiment.

Actions 800 may include sending an alert to an operator on-board the mobile platform 802. For example, an audible alert, a visible alert, or both may be sent to a human or other operator on the mobile platform to indicate that an undesired event has occurred in network traffic on the network on the mobile platform. The alert may indicate the nature of the undesired event or the suspected underlying cause or causes of the event. The alert also may include one or more suggestions for further action to take in response to the alert. For example, sending an alert to an operator on-board the mobile platform 802 may include reporting the undesired event to a communications manager on an aircraft network data processing system on an aircraft. Based on the urgency of the event, the communications manager function may prioritize communication of the alert and transmit as appropriate.

Actions 800 also may include sending an alert to an off-board system 804. Sending an alert to an off-board system 804 may include, for example, sending an alert to a ground operations facility. The alert sent to the off-board system may have one or more of the characteristics of the alert sent to an operator on-board the mobile platform, as described above. Actions 800 also may include sending a log file to an off-board system 806. For example, a log file of network traffic may be sent to a ground operations facility for more detailed analysis than may be available on the mobile platform.

As an example, following receipt of an alert from an aircraft in flight, aircraft ground operations may request downloading of the log file of network traffic from the aircraft to the ground operations. The log file may then be prepared for transmittal and sent over the appropriate communications channel, depending on the urgency as defined by the ground operations. If the event is of an urgent nature, the airline or other aircraft operator may also be notified that the occurrence of an undesired event has been determined on the aircraft. This notification would allow the aircraft operator to address other mobile platforms that may have a similar configuration and potentially a similar threat or other issue that may not yet be detected.

Actions 800 also may include automatically changing network access 808 to the network or to certain portions of the network, automatically disabling a function 810 performed by the network or by a system or device connected to the network, or other actions 812. For example, without limitation, other actions 812 may include limiting communications between different domains in an aircraft network data processing system, restricting data flows from the ground to an aircraft to data flows from trusted links, or disabling all communication until a threat is cleared or a channel is determined to be safe. As another example, other actions 812 may include triggering a maintenance operation or changing routing in the network to ensure proper network communications in response to a determination of network degradation or another determination of the occurrence of an undesired event.

Actions 800 may include automated actions, actions performed by humans, or both in any combination. As an example, in response to the determination of a certain unwanted event on an aircraft, specific action may be taken by the flight crew on the aircraft. For example, the determination of an unwanted event may indicate suspect network traffic from a cabin wireless system. In this case, the flight crew may be alerted to disable the suspect system or function in flight.

Figure 9:
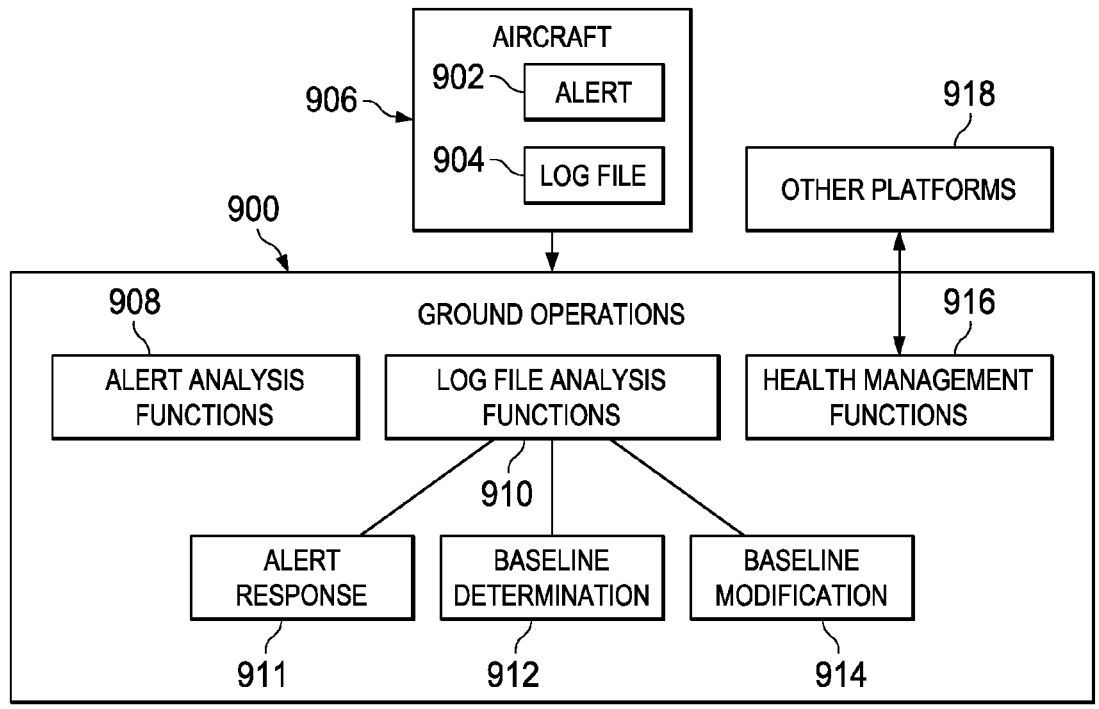
FIG. 9 is a block diagram of ground operations in accordance with an advantageous embodiment.

Turning now to FIG. 9, a block diagram of ground operations is depicted in accordance with an advantageous embodiment. In this example, ground operations 900 is an example of ground operations 232 in FIG. 2.

Ground operations 900 may receive alert 902 from aircraft 906. For example, ground operations 900 may receive alert 902 from aircraft 906 in flight when an undesired event is determined to occur in network traffic on aircraft 906. Ground operations 900 may include alert analysis functions 908 for analyzing alert 902 received from aircraft 906. For example, alert analysis functions 908 may be used to determine further appropriate actions to be taken in response to alert 902.

In one example, alert analysis functions 908 may determine that log file 904 or a portion of log file 904 should be sent to ground operations 900 from aircraft 906 for further analysis. In another example, log file 904 may be sent to ground operations 900 as part of a normal, periodic, or other maintenance operation. As discussed above, log file 904 may comprise a record of network traffic on aircraft 906. For example, log file 904 may comprise a record of the occurrence of selected events in network traffic on aircraft 906, including the time of occurrence of those events.

Log file 904 may be analyzed by log file analysis functions 910. Log file analysis functions 910 may be used for alert response 911, baseline determination 912, and baseline modification 914. For example, in response to receiving log file 904 from aircraft 906 following alert 902, log file analysis functions 910 may analyze log file 904 to determine an appropriate alert response 911 to alert 902. In this case, alert response 911 may be in addition to any other action initiated in response to alert 902 on aircraft 906 or by ground operations 900.

Baseline determination 912 may comprise determining a baseline of network traffic on the network of an aircraft based on an analysis of log file 904. Baseline modification 914 may comprise modifying an existing baseline based on an analysis of log file 904. Both baseline determination 912 and baseline modification 914 may be based on logged network traffic obtained from aircraft 906 or from many aircraft similar to aircraft 906 over a period of time of operation of such aircraft.

Ground operations 900 also may comprise health management functions 916. Health management functions 916 may receive information regarding network traffic and alerts for other platforms 918. For example, other platforms 918 may include aircraft operated by various different operators. In this case, other platforms 918 may include aircraft that are similar to or different from aircraft 906. Based on the information received for other platforms 918 and network traffic information and alerts received for aircraft 906, health management functions 916 may detect the emergence of undesired conditions that may affect both aircraft 906 and other platforms 918. In this case, for example, health management functions 916 may inform the operator of aircraft 906 and the operators of other platforms 918 of the emergence of threats so that appropriate action may be taken to protect aircraft 906 and other platforms 918 before such threats are manifested.

Figure 10:
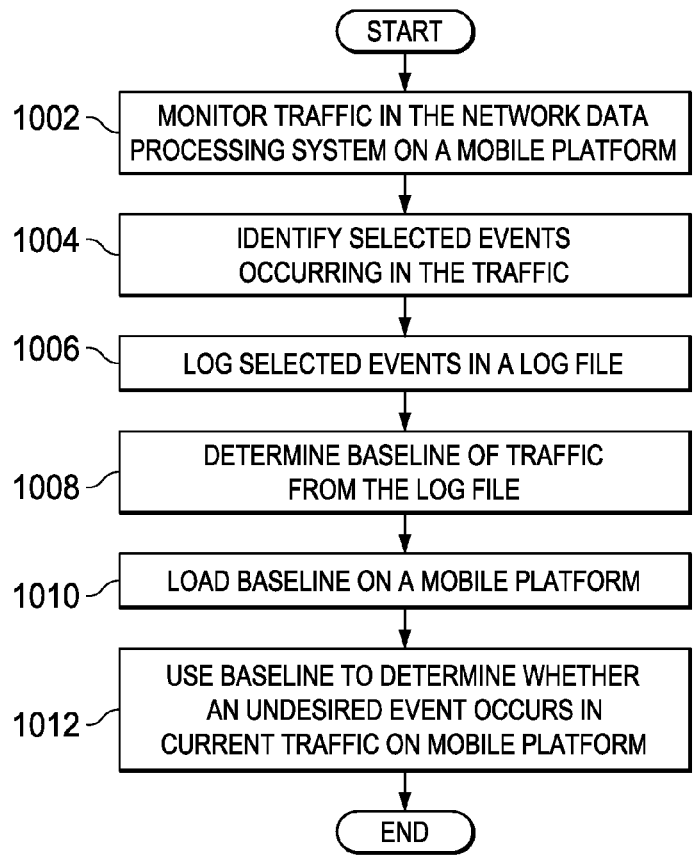
FIG. 10 is a flowchart of a process for determining and using a baseline of traffic in a data processing system network on a mobile platform in accordance with an advantageous embodiment.

Turning now to FIG. 10, a flowchart of a process for determining and using a baseline of traffic in a data processing system network on a mobile platform is depicted in accordance with an advantageous embodiment. The process of FIG. 10 may be implemented, for example, in ground operations 232 and network analyzer 222 on mobile platform 200 of FIG. 2.

The process begins by monitoring traffic in the network data processing system on a mobile platform (operation 1002). Selected events occurring in the monitored network traffic are identified (operation 1004). For example, the selected events identified in operation 1004 may include events that are characteristic of network traffic on the network during normal operation of the mobile platform. The selected events may be logged in a log file (operation 1006). Operation 1006 may include recording the occurrence of the selected events, including the time of occurrence, in the log file.

A baseline of traffic may be determined from the log file (operation 1008). For example, the baseline identified in operation 1008 may describe normal traffic on the network on a mobile platform. Therefore, network traffic that deviates from the baseline may indicate the occurrence of an undesired event.

The baseline identified in operation 1008 may be loaded on a mobile platform (operation 1010). The mobile platform in operation 1010 may be the same as the mobile platform in operation 1002 or may be a different platform of the same type. The baseline may then be used to determine whether an undesired event occurs in current traffic on the mobile platform (operation 1012), with the process terminating thereafter.

Figure 11:
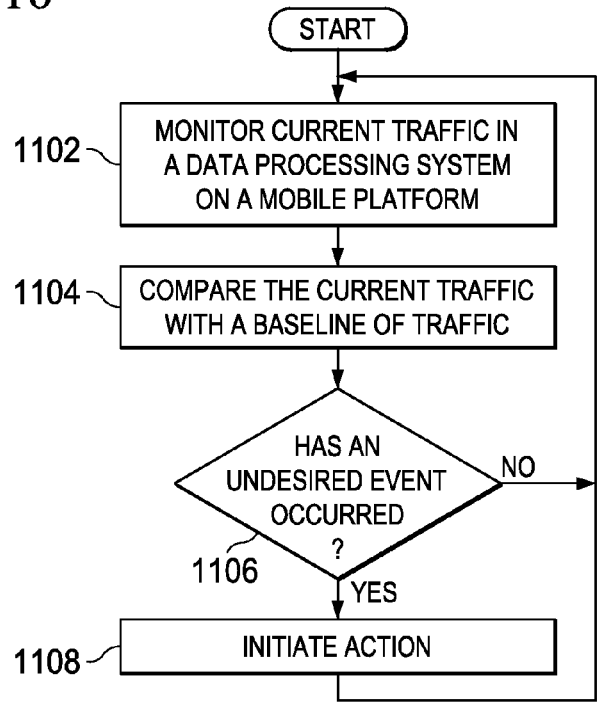
FIG. 11 is a flowchart of a process for monitoring a data processing system network on a mobile platform in accordance with an advantageous embodiment.

Turning now to FIG. 11, a flowchart of a process for monitoring a data processing system network on a mobile platform is depicted in accordance with an advantageous embodiment. The process of FIG. 11 may be implemented, for example, in mobile platform 200 in FIG. 2. In this example, the process of FIG. 11 is one example of a process for implementing operation 1012 in FIG. 10.

The process begins by monitoring current traffic in a data processing system on a mobile platform while the mobile platform is moving (operation 1102). The monitored current traffic is then compared with a baseline of traffic (operation 1104). The baseline of traffic describes normal traffic on the network on the mobile platform. Therefore, a deviation between the current traffic and the baseline may indicate that an undesired event has occurred in the current traffic. Thus, it may be determined from the comparison made in operation 1104 whether an undesired event has occurred (operation 1106). If it is determined that an undesired event has occurred, an appropriate action may be initiated (operation 1108).

For example, operation 1108 may include alerting an operator of the mobile platform that an undesired event has occurred or taking some other appropriate action. After initiating an appropriate action at operation 1108, the process may continue with monitoring the current traffic at operation 1102. If it is determined in operation 1106 that an undesired event has not occurred, the process may continue with monitoring the current traffic at operation 1102.

One or more of the advantageous embodiments provides a capability for monitoring and situational awareness of the network on a mobile platform to provide a baseline operational model. One or more of the advantageous embodiments also provides a capability for providing alerts when the occurrence of an undesired cyber event is detected on the network. Such undesired events may include unauthorized access, malware operation, or malicious intent from a subscribing system or external interface. One or more of the advantageous embodiments provides a software application that monitors the network and security logging of the system. The application may include algorithms to establish a baseline operational mode and parameters for providing alerts when those baselines are exceeded.

The flowcharts and block diagrams in the different depicted embodiments illustrate the architecture, functionality, and operation of some possible implementations of apparatus and methods in an advantageous embodiment. In this regard, each block in the flowcharts or block diagrams may represent a module, segment, function, and/or a portion of an operation or step. For example, one or more of the blocks may be implemented as program code, in hardware, or a combination of program code and hardware. When implemented in hardware, the hardware may, for example, take the form of integrated circuits that are manufactured or configured to perform one or more operations in the flowcharts or block diagrams.

In some alternative implementations of an advantageous embodiment, the function or functions noted in the blocks may occur out of the order shown in the figures. For example, in some cases, two blocks shown in succession may be executed substantially concurrently, or the blocks may sometimes be performed in the reverse order, depending upon the functionality involved. Also, other blocks may be added in addition to the blocks illustrated in a flowchart or block diagram.

Turning now to FIG. 12, an illustration of a data processing system is depicted in accordance with an advantageous embodiment. In this example, data processing system 1200 is an example of one implementation of data processing system 210 in FIG. 2. In this advantageous embodiment, data processing system 1200 includes communications fabric 1202. Communications fabric 1202 provides communications between processor unit 1204, memory 1206, persistent storage 1208, communications unit 1210, input/output (I/O) unit 1212, and display 1214.

Processor unit 1204 serves to execute instructions for software that may be loaded into memory 1206. Processor unit 1204 may be a number of processors, a multi-processor core, or some other type of processor, depending on the particular implementation. A number, as used herein with reference to an item, means one or more items. Further, processor unit 1204 may be implemented using a number of heterogeneous processor systems in which a main processor is present with secondary processors on a single chip. As another illustrative example, processor unit 1204 may be a symmetric multi-processor system containing multiple processors of the same type.

Memory 1206 and persistent storage 1208 are examples of storage devices 1216. A storage device is any piece of hardware that is capable of storing information, such as, for example, without limitation, data, program code in functional form, and/or other suitable information either on a temporary basis and/or a permanent basis. Storage devices 1216 may also be referred to as computer readable storage devices in these examples. Memory 1206, in these examples, may be, for example, a random access memory or any other suitable volatile or non-volatile storage device. Persistent storage 1208 may take various forms, depending on the particular implementation.

For example, persistent storage 1208 may contain one or more components or devices. For example, persistent storage 1208 may be a hard drive, a flash memory, a rewritable optical disk, a rewritable magnetic tape, or some combination of the above. The media used by persistent storage 1208 also may be removable. For example, a removable hard drive may be used for persistent storage 1208.

Communications unit 1210, in these examples, provides for communications with other data processing systems or devices. In these examples, communications unit 1210 is a network interface card. Communications unit 1210 may provide communications through the use of either or both physical and wireless communications links.

Input/output unit 1212 allows for input and output of data with other devices that may be connected to data processing system 1200. For example, input/output unit 1212 may provide a connection for user input through a keyboard, a mouse, and/or some other suitable input device. Further, input/output unit 1212 may send output to a printer. Display 1214 provides a mechanism to display information to a user.

Instructions for the operating system, applications, and/or programs may be located in storage devices 1216, which are in communication with processor unit 1204 through communications fabric 1202. In these illustrative examples, the instructions are in a functional form on persistent storage 1208. These instructions may be loaded into memory 1206 for execution by processor unit 1204. The processes of the different embodiments may be performed by processor unit 1204 using computer-implemented instructions, which may be located in a memory, such as memory 1206.

These instructions are referred to as program instructions, program code, computer usable program code, or computer readable program code that may be read and executed by a processor in processor unit 1204. The program code in the different embodiments may be embodied on different physical or computer readable storage media, such as memory 1206 or persistent storage 1208.

Program code 1218 is located in a functional form on computer readable media 1220 that is selectively removable and may be loaded onto or transferred to data processing system 1200 for execution by processor unit 1204. Program code 1218 and computer readable media 1220 form computer program product 1222 in these examples. In one example, computer readable media 1220 may be computer readable storage media 1224 or computer readable signal media 1226. Computer readable storage media 1224 may include, for example, an optical or magnetic disk that is inserted or placed into a drive or other device that is part of persistent storage 1208 for transfer onto a storage device, such as a hard drive, that is part of persistent storage 1208.

Computer readable storage media 1224 also may take the form of a persistent storage, such as a hard drive, a thumb drive, or a flash memory, that is connected to data processing system 1200. In some instances, computer readable storage media 1224 may not be removable from data processing system 1200. In these examples, computer readable storage media 1224 is a physical or tangible storage device used to store program code 1218 rather than a medium that propagates or transmits program code 1218. Computer readable storage media 1224 is also referred to as a computer readable tangible storage device or a computer readable physical storage device. In other words, computer readable storage media 1224 is a media that can be touched by a person.

Alternatively, program code 1218 may be transferred to data processing system 1200 using computer readable signal media 1226. Computer readable signal media 1226 may be, for example, a propagated data signal containing program code 1218. For example, computer readable signal media 1226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the advantageous examples.

In some advantageous embodiments, program code 1218 may be downloaded over a network to persistent storage 1208 from another device or data processing system through computer readable signal media 1226 for use within data processing system 1200. For instance, program code stored in a computer readable storage medium in a server data processing system may be downloaded over a network from the server to data processing system 1200. The data processing system providing program code 1218 may be a server computer, a client computer, or some other device capable of storing and transmitting program code 1218.

The different components illustrated for data processing system 1200 are not meant to provide architectural limitations to the manner in which different embodiments may be implemented. The different advantageous embodiments may be implemented in a data processing system including components in addition to or in place of those illustrated for data processing system 1200. Other components shown in FIG. 12 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1204 may take the form of a hardware unit that has circuits that are manufactured or configured for a particular use. This type of hardware may perform operations without needing program code to be loaded into a memory from a storage device to be configured to perform the operations.

For example, when processor unit 1204 takes the form of a hardware unit, processor unit 1204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 1218 may be omitted because the processes for the different embodiments are implemented in a hardware unit.

In still another illustrative example, processor unit 1204 may be implemented using a combination of processors found in computers and hardware units. Processor unit 1204 may have a number of hardware units and a number of processors that are configured to run program code 1218. With this depicted example, some of the processes may be implemented in the number of hardware units, while other processes may be implemented in the number of processors.

In another example, a bus system may be used to implement communications fabric 1202 and may be comprised of one or more buses, such as a system bus or an input/output bus. Of course, the bus system may be implemented using any suitable type of architecture that provides for a transfer of data between different components or devices attached to the bus system.

Additionally, communications unit 1210 may include a number of devices that transmit data, receive data, or transmit and receive data. Communications unit 1210 may be, for example, a modem or a network adapter, two network adapters, or some combination thereof. Further, a memory may be, for example, memory 1206, or a cache, such as found in an interface and memory controller hub that may be present in communications fabric 1202.

The different advantageous embodiments can take the form of an entirely hardware embodiment, an entirely software embodiment, or an embodiment containing both hardware and software elements. Some embodiments are implemented in software, which includes, but is not limited to, forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output, or I/O devices, can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems, remote printers, or storage devices through intervening private or public networks. Non-limiting examples are modems and network adapters. These are just a few of the currently-available types of communications adapters.

As used herein, the phrase "at least one of", when used with a list of items, means that different combinations of one or more of the listed items may be used and only one of the items listed may be needed. For example, "at least one of item A, item B, and item C" may include, for example, without limitation, item A, or item A and item B. This example also may include item A, item B, and item C, or item B and item C.

The description of the different advantageous embodiments has been presented for purposes of illustration and description and is not intended to be exhaustive or to limit the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for monitoring an aircraft network data processing system on an aircraft comprising:
   monitoring, by a processor unit on the aircraft, current data traffic in the aircraft network data processing system on the aircraft while the aircraft is in flight, wherein the current data traffic is selected from the group consisting of current data packet traffic and current datagram traffic;
   comparing, by the processor unit on the aircraft, the current data traffic with a baseline of data traffic in the aircraft network data processing system on the aircraft to form a comparison, wherein the baseline of data traffic is selected from the group consisting of a baseline of data packet traffic and a baseline of datagram traffic;
   determining whether an undesired event has occurred in the current data traffic based on the comparison; and
   initiating an action responsive to a determination that the undesired event has occurred.

2. The method of claim 1, wherein initiating the action is selected from at least one of sending an alert to an operator on the aircraft, sending the alert to a system that is not on the aircraft, and changing access that is allowed to a computer in the aircraft network data processing system on the aircraft.

3. The method of claim 1 further comprising:
   logging selected events occurring in the current data traffic to form a log file; and
   sending the log file to a system that is not on the aircraft responsive to the determination that the undesired event has occurred.

4. The method of claim 1, wherein determining whether the undesired event has occurred comprises:
   determining whether the undesired event has occurred based on a current location of the aircraft.

5. The method of claim 1, wherein determining whether the undesired event has occurred comprises:
   determining whether the undesired event has occurred based on a current state of the aircraft.

6. The method of claim 1 further comprising determining whether a network has degraded based on the comparison.

7. The method of claim 1, wherein the baseline of data traffic is determined by:
   identifying selected events occurring in the current data traffic in the aircraft network data processing system on the aircraft while the aircraft is in operation over a period of time;
   logging the selected events to form a log file; and
   determining the baseline of data traffic from the log file.

8. The method of claim 1, wherein the undesired event is selected from the group consisting of an unauthorized access of the aircraft network data processing system, a malware operation on the aircraft network data processing system, or a malicious activity directed toward the aircraft network data processing system.

9. An apparatus comprising:
   a network analyzer on an aircraft, the network analyzer connected to an aircraft network data processing system on the aircraft and configured to:
   monitor current data traffic in the aircraft network data processing system on the aircraft while the aircraft is in flight, wherein the current data traffic is selected from the group consisting of current data packet traffic and current datagram traffic;
   compare the current data traffic with a baseline of data traffic in the aircraft network data processing system to form a comparison, wherein the baseline of data traffic is selected from the group consisting of a baseline of data packet traffic and a baseline of datagram traffic;
   determine whether an undesired event has occurred in the current data traffic based on the comparison; and
   initiate an action responsive to a determination that the undesired event has occurred.

10. The apparatus of claim 9, wherein the network analyzer is configured to initiate the action selected from at least one of providing an alert to an operator on the aircraft, providing an alert to a system that is not on the aircraft, and changing access that is allowed to a computer in the aircraft network data processing system.

11. The apparatus of claim 9, wherein the network analyzer is further configured to:
   log selected events occurring in the current data traffic to form a log file; and
   send the log file to a system that is not on the aircraft responsive to the determination that the undesired event has occurred.

12. The apparatus of claim 9, wherein the network analyzer is configured to determine whether the undesired event has occurred based on a current location of the aircraft.

13. The apparatus of claim 9, wherein the network analyzer is configured to determine whether the undesired event has occurred based on a current state of the aircraft.

14. The apparatus of claim 9, wherein the baseline of data traffic is determined by:
   identifying selected events occurring in the current data traffic in the aircraft network data processing system on the aircraft while the aircraft is in operation over a period of time;
   logging the selected events to form a log file; and
   determining the baseline of data traffic from the log file.

15. The apparatus of claim 9, wherein the undesired event is selected from the group consisting of an unauthorized access of the aircraft network data processing system, a malware operation on the aircraft network data processing system, or a malicious activity directed toward the aircraft network data processing system.

16. A method for identifying a baseline of data traffic in an aircraft network data processing system on an aircraft, comprising:
   identifying selected events occurring in data traffic in the aircraft network data processing system on the aircraft while the aircraft is in flight, wherein the data traffic is selected from the group consisting of data packet traffic and datagram traffic;
   logging the selected events to form a log file; and
   identifying the baseline of data traffic from the log file, wherein the baseline of data traffic is selected from the group consisting of a baseline of data packet traffic and a baseline of datagram traffic.

17. The method of claim 16 further comprising:
   loading the baseline of data traffic onto another aircraft;
   monitoring, by a processor unit on the other aircraft, current data traffic in an aircraft network data processing system on the other aircraft while the other aircraft is in flight, wherein the current data traffic is selected from the group consisting of current data packet traffic and current datagram traffic;
   comparing, by the processor unit, the current data traffic with the baseline of data traffic to form a comparison;
   determining whether an undesired event has occurred in the current data traffic based on the comparison; and
   initiating an action responsive to a determination that the undesired event has occurred.

18. The method of claim 17 further comprising:
   logging the selected events occurring in the current data traffic to form another log file; and
   modifying the baseline of data traffic based on the other log file.

19. The method of claim 17, wherein the undesired event is selected from the group consisting of an unauthorized access of the aircraft network data processing system, a malware operation on the aircraft network data processing system, or a malicious activity directed toward the aircraft network data processing system.

20. The method of claim 19, wherein initiating the action is selected from the group consisting of sending an alert to an operator on the aircraft, sending the alert to a system that is not on the aircraft, and changing access that is allowed to a computer in the aircraft network data processing system on the aircraft.

* * * * *